United States Patent
Maes et al.

(10) Patent No.: US 7,310,819 B2
(45) Date of Patent: *Dec. 18, 2007

(54) PROCESSING COPY PROTECTION SIGNALS

(75) Inventors: Maurice Jerome Justin Jean-Baptiste Maes, Eindhoven (NL); Antonius Adriaan Maria Staring, Eindhoven (NL); Johan Cornelis Talstra, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1132 days.

This patent is subject to a terminal disclaimer.

(21) Appl. No.: 10/240,913

(22) PCT Filed: Feb. 1, 2002

(86) PCT No.: PCT/IB02/00350

§ 371 (c)(1),
(2), (4) Date: Oct. 4, 2002

(87) PCT Pub. No.: WO02/065255

PCT Pub. Date: Aug. 22, 2002

(65) Prior Publication Data

US 2003/0090698 A1    May 15, 2003

(30) Foreign Application Priority Data

Feb. 13, 2001  (EP)  .................... 01200515

(51) Int. Cl.
*H04L 9/00*    (2006.01)
*G06F 21/22*   (2006.01)

(52) U.S. Cl. ............... 726/26; 713/176; 713/179; 705/57

(58) Field of Classification Search ............ None
See application file for complete search history.

(56) References Cited

U.S. PATENT DOCUMENTS

| 6,700,989 B1 * | 3/2004 | Itoh et al. ............ 382/100 |
| 6,701,062 B1 * | 3/2004 | Talstra et al. .......... 386/94 |
| 6,937,553 B1 * | 8/2005 | Mitui et al. ........... 369/84 |

FOREIGN PATENT DOCUMENTS

| EP | 0969462 | * | 1/2000 |
| EP | 0969462 A1 | | 1/2000 |
| EP | 1005040 A1 | | 5/2000 |

OTHER PUBLICATIONS

"System Issues in Digital Image and Video Watermarking for Copy Protection", by T. Kalker, Philips Research Eindhoven, pp. 562-567. XP-002132684, no date provided.

* cited by examiner

*Primary Examiner*—Christopher Revak

(57) ABSTRACT

A method and device if or recording an information signal with first copy protection information to a storage medium includes recording according to first copy rules identified by the first copy protection information. The first copy protection information identifying the first copy rules is detected, and at least second copy protection information is recorded according to the detected first copy rules. The first and second copy protection information identify a legality message to be interpreted by reader. Screening information is recorded in a safe way on the storage medium to identify that the first copy protection message has been read.

9 Claims, 5 Drawing Sheets

PROCESSING COPY PROTECTION SIGNALS

FIELD OF THE INVENTION

The invention relates to a method and arrangement for recording an information signal, the invention also relates to a method and arrangement for reading an information signal. The invention further relates to a device for recording and/or reading an information signal.

BACKGROUND OF THE INVENTION

With the advent of cheap digital IC-technology, two new methods have emerged for protecting multimedia content (video, audio, etc): encryption and watermarking. These tools are added to already existing ones like CGMS copy-bits for CD and video, and Macrovision spoiler signals for VCRs. Since these protection methods all have their particular strengths and weaknesses, they are or will be applied as a mixture in various combinations.

A watermark is an imperceptible label that is embedded/added to an information/host signal comprising multimedia content. The label may contain for instance copyright information, copy protection information, the name of the owner of the content. The information that may be stored in or derived on the basis of a watermark is usually referred to as a payload and is expressed in bits. In most watermark schemes the watermark is a pseudo-random noise sequence (pn-sequence), which is added to a host signal/information signal in either the time, spatial or a transformed domain (e.g. Fourier, Discrete Cosine or Wavelet Domain). Watermark detection is then usually based on a correlation between the watermark and the embedded host signal.

Watermarks are detected and decoded after the piece of content to which they pertain has been played/recorded, which poses interesting real-time problems. A number of popular copy-protection system architectures subscribe to the following axioms:

1. When recording from an analogue (or unencrypted digital) source, if the incoming content has been watermarked copy once (CO), signifying that it may be copied once by this recorder, but no further copies of the first copy are allowed, this content shall be:
   a) Remarked, i.e. a second watermark will be added signifying that it cannot be copied again: copy-no-more (CNM).
   b) Encrypted before transferral to the storage medium (tape, optical or magnetic disk). E.g. working group 9 of the DVD-forum has mandated that copy-once content shall be encrypted whilst stored on disk. The 4C CPSA copy-protection architecture (Copy Protection for Recorded Media, by IBM, Intel, Matsushita, Toshiba) is another example.
   Note that if the content is marked CO but has already been remarked (CNM) it will obviously not be recorded again.
2. Content watermarked as copy never (CN) or CNM shall not be recorded.
3. Content watermarked copy free (CF), or non-watermarked material, shall be recorded without further encryption. This has not been formally agreed, but holds the status of a communis opinio.
4. In a player, the CNM and CN content should be encrypted on the record carrier. Unencrypted content with a CNM or CN watermark is therefore considered illegal. Thereby playback of media with illegal content is impossible, illegal content could be recorded by e.g. pirates using non-compliant recorders to dump watermarked content on a disk.
5. Watermarks only need to be checked in unencrypted content (playback and recording).

Recently a new category of content has been defined, called "Copy Free, no internet retransmission" (CFNIR): it can be copied freely within the home, but may not be retransmitted outside the home, for example via the Internet. It is to be treated as CO content, without the remark step. For such content the following axiom has been defined:

6. Content watermarked as "Copy Free, no internet retransmission" (CFNIR) may be recorded. This material shall be encrypted before transferral to the storage medium (tape, optical or magnetic disk).

Information in the watermarks regarding CNM, CN, CF and CO are interpreted and used as defined in the axioms when recording and playing back the content.

These described axioms should be able to deal with three types of recorders:

Compliant CO-enabled. These types of recorders can make CO recordings.

Compliant not CO-enabled. These type of recorders cannot record CO content, e.g. because they cannot remark or encrypt in accordance with axiom 1, but have a watermark detector to recognize the CN or CO-status.

Non-compliant recorders. These types of recorders are recorders modified by counterfeiters or legacy devices.

Watermark detection is a statistical process with the probability of successful detection depending heavily on things like the nature of the underlying content (lots of edges, high standard deviation etc.), signal to noise ratio (SNR) of the incoming signal, synchronization etc. The consequence is, that temporarily dropouts of the watermark might occur and during recording of CO content according to axiom 1 the encryption process will be interrupted.

This results not only in sub-optimal content protection, but intermittent stretches of unencrypted content also pose a big threat to the consumer during playback. As mentioned in axiom 4 above, watermark detectors not only operate during the recording phase, but also during playback. Again because of the statistical nature of the detection process, it may very well happen that where the watermark detector in the recorder did not discern the CO watermark, the detector in the player does discern the CO watermark in one of the unencrypted stretches. Axiom 4 dictates that the player is obliged to interpret this as illegal because all CO content should be encrypted, and will cease playback. Although the probability of different watermark detector behavior in the recorder and the players is not large, with a large numbers of recorders and players on the market, it cannot be neglected.

It has been proposed to solve the above-mentioned problems by encrypting both CO and CF content. If CF content is also encrypted, watermark detection dropouts are trivially taken care of. Although some implementers in the SDMI arena have adopted this principle, it has as a major drawback that consumers need compliant software (i.e. containing decryption keys) even for processing content they produced themselves (e.g. editing home-videos requires licensed software). It is not clear whether the encryption-key licensing agent would want to make keys available for video-editing computer programs, potentially exposing vital secrets of the encryption system.

OBJECT AND SUMMARY OF THE INVENTION

It is an object of the invention to provide a method for solving the above-mentioned problems.

This is achieved by a method (and corresponding arrangement) of recording an information signal with first copy protection information to a storage medium using recording means, said recording being performed according to first copy rules identified by said first copy protection information, said method comprising the steps of:
  detecting said first copy protection information identifying said first copy rules,
  recording at least second copy protection information according to said detected first copy rules, said first and at least second copy protection information identifying a legality message to be interpreted by reading means,
  recording screening information in a safe way on said storage medium, said screening information identifying that the first copy protection message has been read.

The invention further relates to a method (and corresponding arrangement) for reading an information signal comprising the steps of:
  detecting the presence of a legality message being interpreted from first copy protection information and at least second copy protection information, said second copy protection information having been added by recording means,
  detecting screening information in said information signal,
  according to the legality message or the screening information determining the legality of the information signal.

The invention also relates to a device for recording or reading and information signal according to the above.

The invention also relates to a storage medium having stored thereon an information signal with first and at least second copy protection information identifying a legality message to be interpreted by reading means, the information signal further comprising screening information, said screening information having been stored in a safe way on said storage medium.

By the invention a method of recording information signal is obtained solving the problem with dropouts in copy protection signals. Introducing screening info, which can be used when determining the legality of the information signal, solves this. The screening information is stored in a safe way whereby it is difficult for hackers to access the information.

BRIEF DESCRIPTION OF THE DRAWINGS

In the following preferred embodiments of the invention will be described referring to the figures, wherein.

DESCRIPTION OF PREFERRED EMBODIMENTS

In the embodiments described below the first copy protection information is a watermark identifying the copy rules CF (Copy Free), CFNIR (Copy Free No Internet Retransmission) or CO (Copy Once). The second copy protection information is an encrypted information signal or an unencrypted information signal and the third copy information is the presence of a watermark representing CNM (Copy No More).

Figure 1:
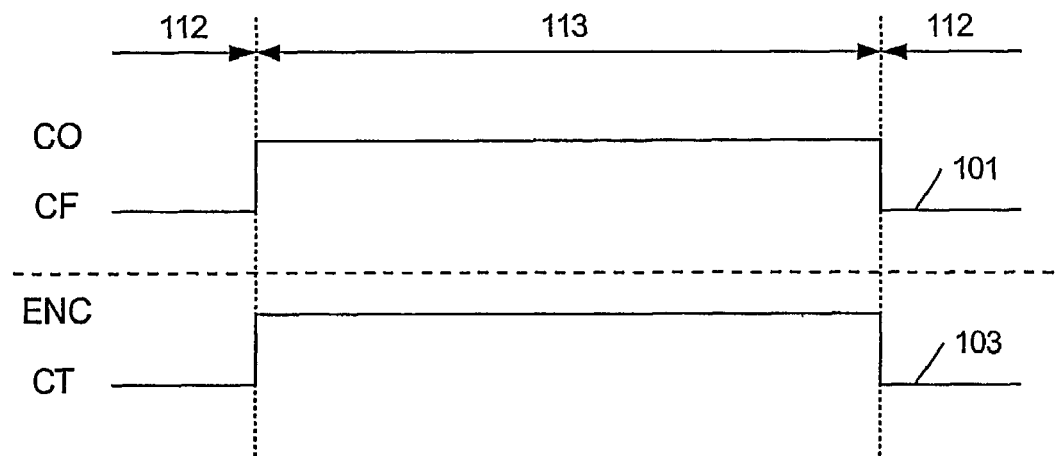
FIG. 1 illustrates the watermark information 101 in an information signal.

FIG. 1 illustrates the watermark information 101 in an information signal, where some of the content 112 in the information signal has a watermark CF (Copy Free) and other content 113 have a watermark CO (Copy Once). The figure also illustrates how the watermark information changes when the type of information in the information signal changes. According to axiom 1 described above when recording the information signal the CO content should be encrypted (ENC) and marked CNM (Copy No More). The CF content should remain clear text (CT) as shown by 103.

Figure 2:
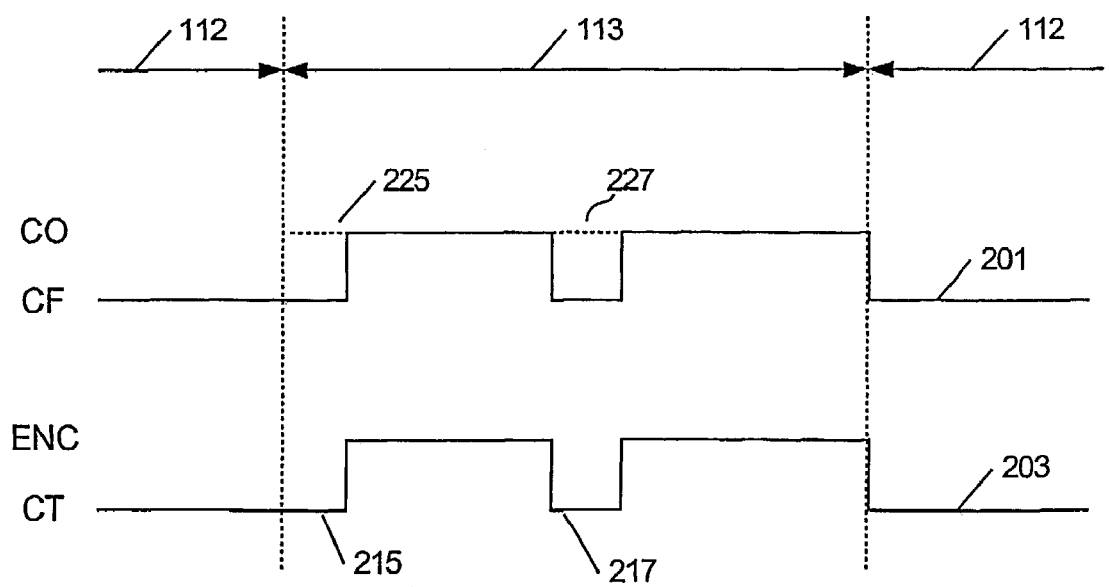
FIG. 2 illustrates real-time behavior of watermark detector and encryptor at recording of the signal in FIG. 1 with a watermark dropout.

FIG. 2 illustrates real-time behavior of watermark detector and encryptor at recording of the signal in FIG. 1 with a watermark dropout. A transition between CF content to CO content and back to CF content is shown, the CF content 112 could e.g. be news and the CO content 113 could be a movie. The watermark signal is illustrated at 201 and the encryption status of the recorded information signal is illustrated at 203. At 225 and 227 the watermark information should be detected as CO, but the watermark was detected as CF and thereby the information signal is not encrypted according to axiom 3. When a reader then reads the recorded information it might not have dropouts at 225 and 227 whereby the information signal is considered illegal because of the combination of an unencrypted information signal and detected CO content.

The above dropout problem is solved, by recording additional data testifying that all recorded content (whether CF or CO) has been checked. The additional data is referred to as screening info and in case of a CO watermark in unencrypted content, the player uses the presence of this screening info to interpret this as resulting from a recording with sub-optimal detection (which may be played), and the absence of screening info as a non-compliant recording without watermark detection (which should not be played). The screening info should according to the invention be stored in a way, whereby the screening info is hard to access/modify by a counterfeiter, since the presence of this information effectively replaces all play-control by trust in the record control of the recorder.

Figure 3:
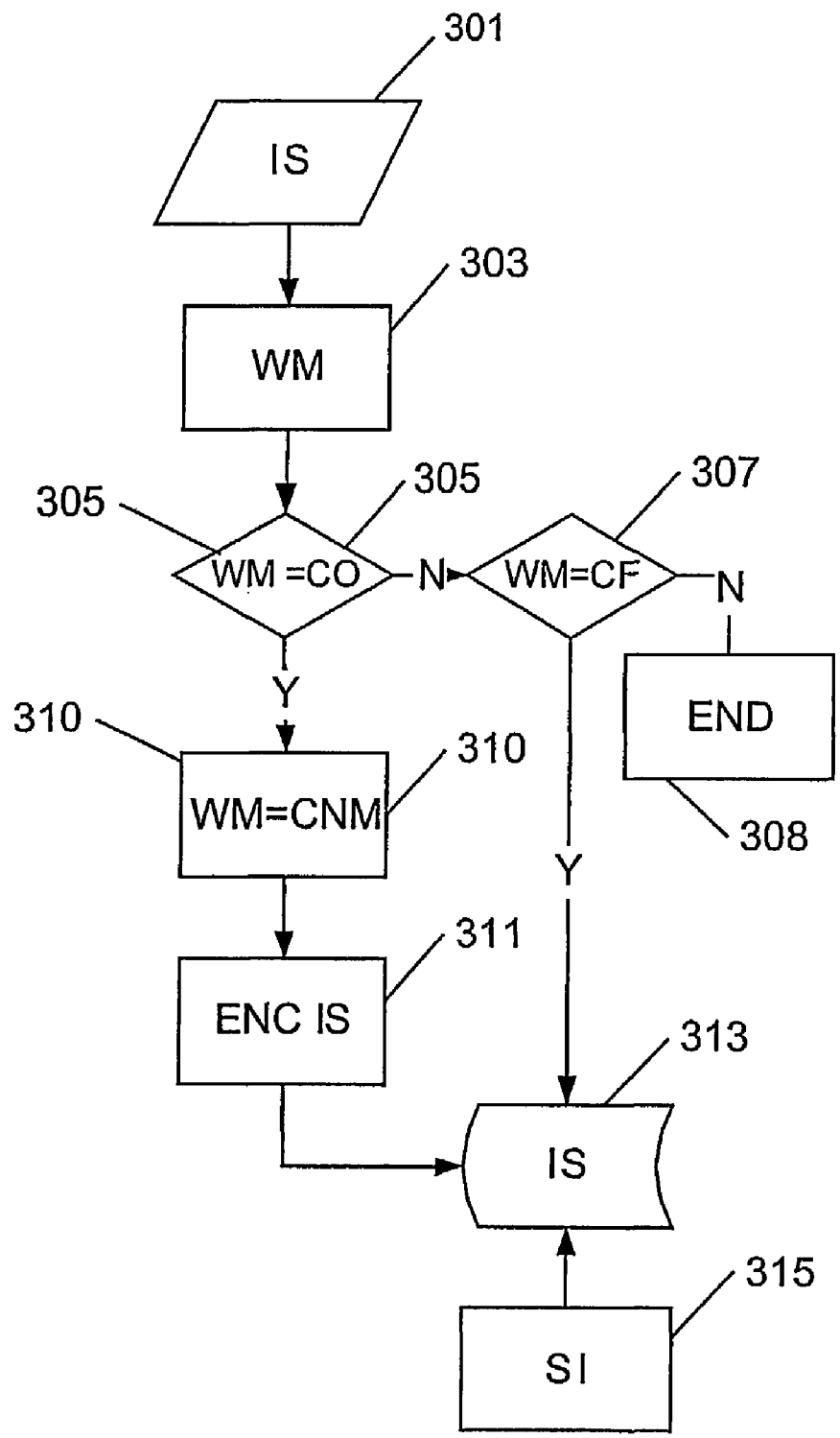
FIG. 3 illustrates a method of recording an information signal (IS) according to axiom 1 and further adding screening info (SI)

FIG. 3 illustrates a method of recording an information signal (IS) according to axiom 1 and further adding screening info (SI) used to avoid the problem introduced by dropout detection of watermarks during recording and reading. First the watermark (WM) 303 is detected in the information signal (IS) 301. In 305 it is checked whether watermark information is CO and if it is, the watermark copy no more (CNM) is added 310, the information signal is encrypted 311 and the encrypted information signal comprising the added watermark is recorded on a storage medium 313. If the watermark information is not CO, it is checked whether the watermark is CF 307 and if it is the information signal is stored unencrypted as clear text (CT) on the storage medium 313. Otherwise, further recording of the information signal (IS) is aborted 308. Finally, e.g. when the whole information signal has been recorded, screening info 315 is stored in a safe way on the storage medium 313.

In a specific embodiment the safe way of recording the screening info can be by recording the SI in a secure channel. The channel should then have the properties that a user cannot directly manipulate the content of the channel. Further there should be no legitimate use of the secure channel other than copy protection, whereby other manufacturers are stopped from bringing recorders to the market, which give users write access to the channel, under the pretext of providing reasonable new features to the consumer.

The secure channel could in a specific embodiment be a secure side channel, which only circuitry in a recorder detecting the watermark can write to. An example of such a side channel could be the redundancy of the channel code on optical media as in U.S. Pat. No. 5,669,434. In another embodiment the channel could be the 6 "RSV" bytes in the sector headers of DVD+RW/DVD-RW/DVD-RAM disks.

Figure 4:
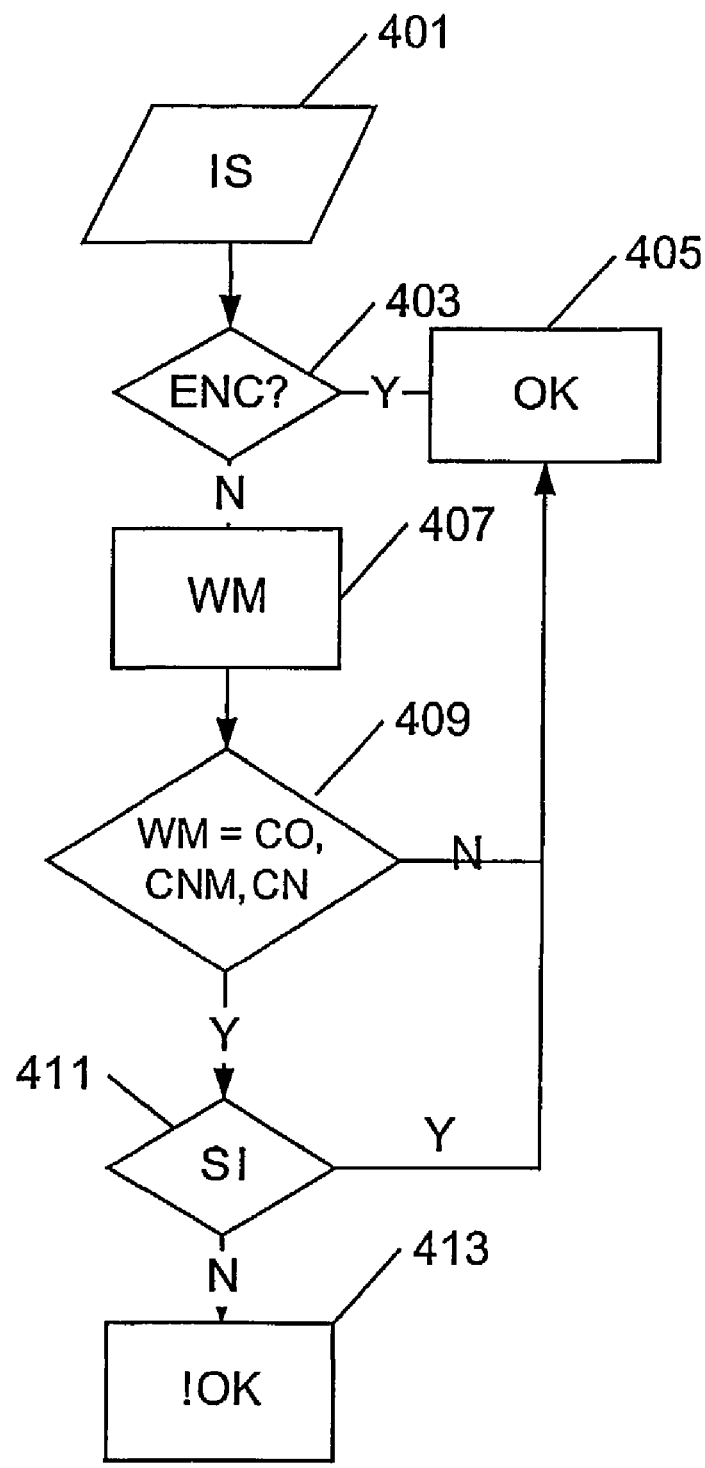
FIG. 4 illustrates how a reader reads the recorded information signal using the screening information.

In FIG. 4 it is illustrated how a reader reads the recorded information signal using the screening information. First it is checked in 403 whether information signal (IS) 401 is encrypted, and if it is so, then the information signal is legal 405 and can be accessed. If it is not encrypted, a watermark is detected 407. In 409 it is checked whether the watermark information is one or more of CO, CNM or CN. If it is not so, the information signal is legal 405. If it is watermarked CO, CNM or CN, it is checked whether there is valid screening info (SI) present 411 on the storage medium that carries the information signal. If there is, the information signal is legal, otherwise it is illegal and cannot be processed (!OK) 413.

An alternative method of recording the screening information in a safe way is an embodiment where the screening information is encrypted. The screening information could be encrypted using the same encryption system as used for encrypting the information signal. The encrypted information can in this case be stored as a user accessible file. The encryption of the screening information does not have to be better than the encryption of the information signal because of the following "scrambling hack" as described by I. J. Cox and J.-P. M. G. Linnartz, IEEE J. Select, Areas Comm. 16, pp. 587-593 (1998). If a counterfeiter has hacked the content encryption system (e.g. CPRM) the counterfeiter can copy all content the counterfeiter wants by encrypting the illegal content and store it using a non-compliant recorder. There will be no watermark detection, because of axiom 5.

Figure 5:
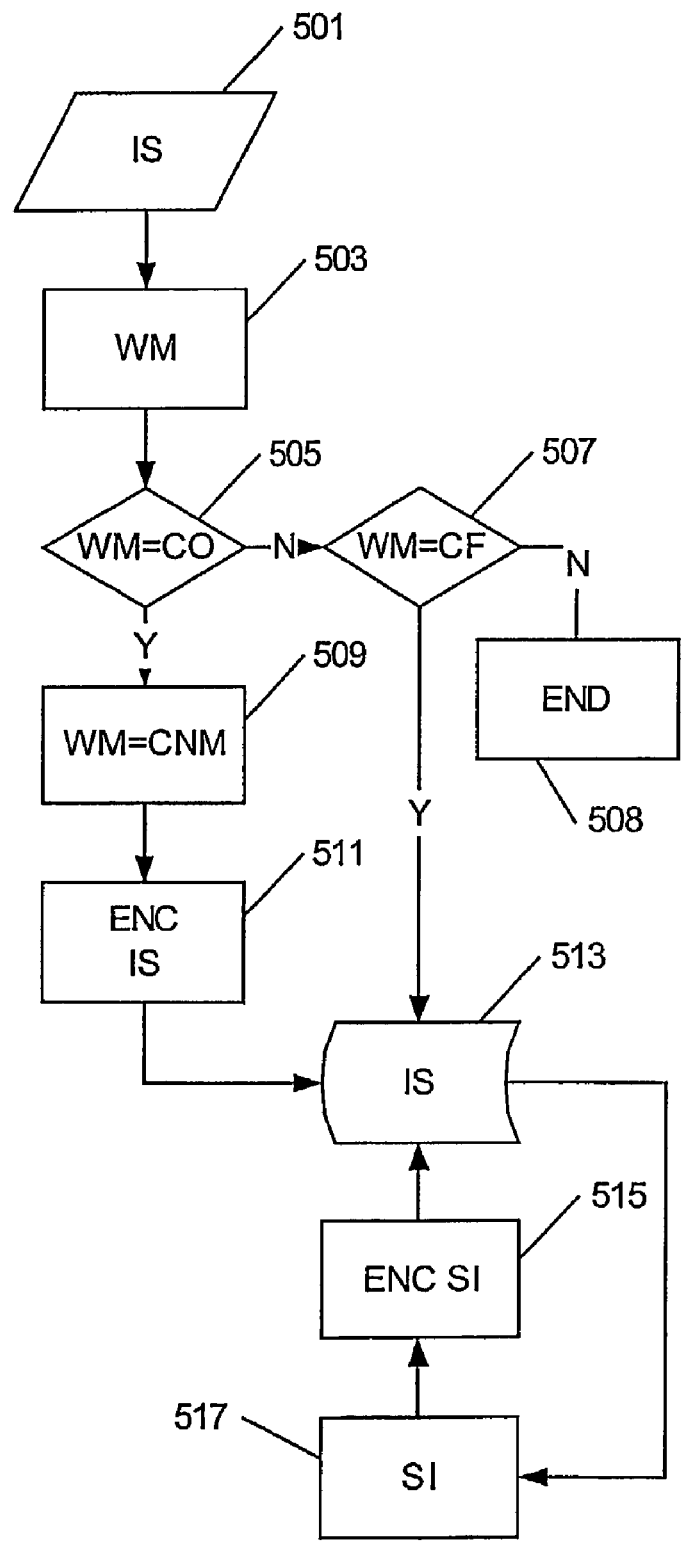
FIG. 5 illustrates a method of recording an information signal (IS) according to axiom 1 and further encrypting and adding screening info (SI)

FIG. 5 illustrates a method of recording an information signal (IS) according to axiom 1 and further encrypting and adding screening info (SI). First the watermark (WM) 503 is detected in the information signal (IS) 501. In 505 it is checked whether watermark information is CO and if it is the watermark copy no more (CNM) is added 509, the information signal is encrypted 511 and the encrypted information signal comprising the added watermark is recorded on a storage medium 513. If the watermark information is not CO, it is checked whether the watermark is CF 507 and if it is the information signal is stored unencrypted as clear text 513 on the storage medium. Otherwise, further recording of the information signal (IS) is aborted 508. Finally when the whole information signal has been recorded screening info 517 is first encrypted 515 and stored on the storage medium.

The encryption of the screening information could include a hash or a digital summary of the information signal that it belongs to, thereby it is obtained that the encrypted screening info is unique for a specific information signal and it can thereby not be reused. It prevents a hacker from placing illegal content on a medium using a non-compliant recorder, and adding the necessary screening information by "copy-and-pasting" it from a legitimate recording. The hash ties the screening info to a particular piece of content, and bars "re-use". A specific embodiment would be to tie the serial number of the record carrier into the hash. This prevents bit-copies of a compliant recording on a non-compliant recording.

In a preferred embodiment the hash information are put into a hash watermark that is added to the information signal before recording.

Figure 6:
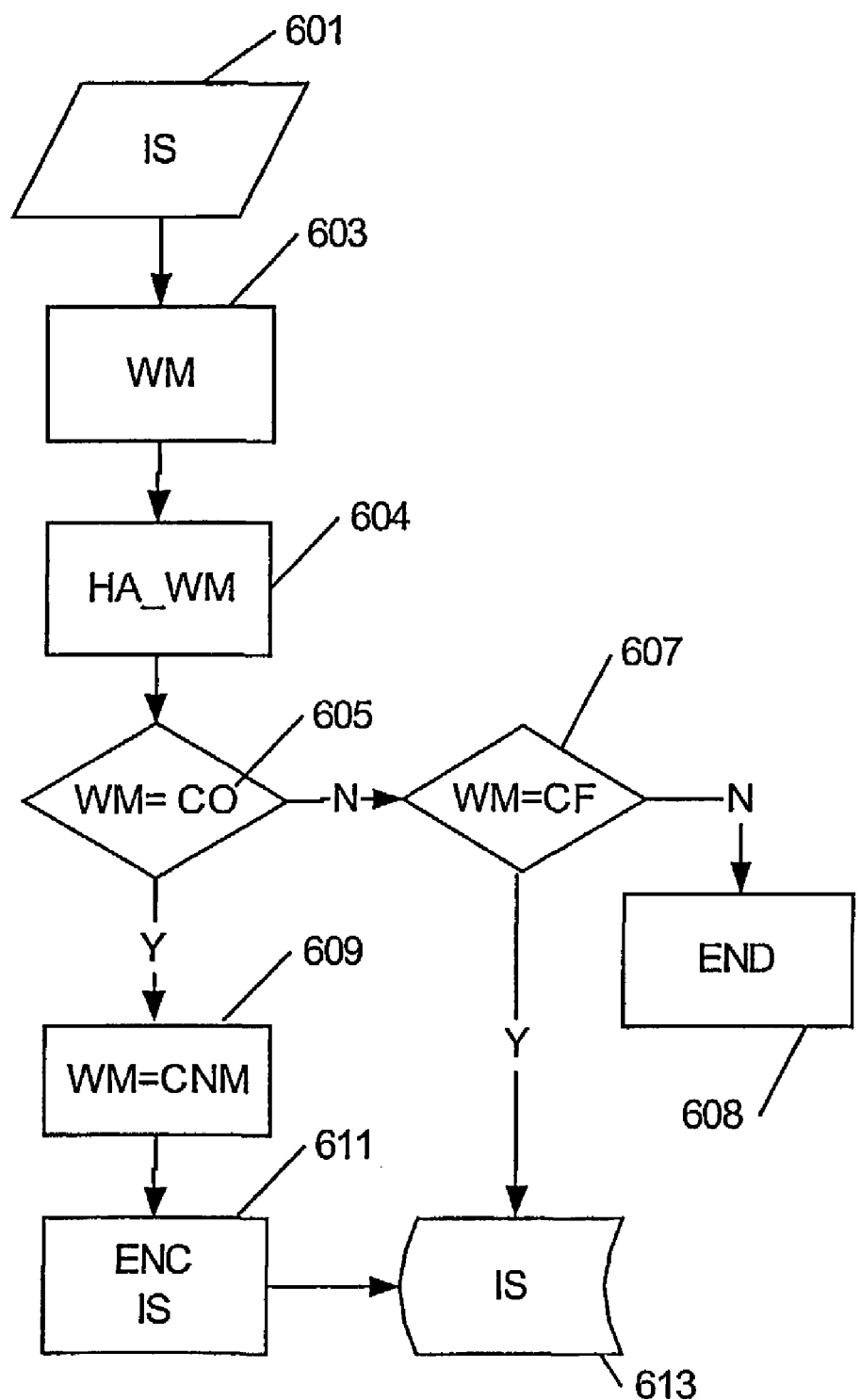
FIG. 6 illustrates a illustrates a method of recording an information signal (IS) according to axiom 1 and further encrypting and adding screening info (SI) and hash information as a watermark in the recorded information signal.

FIG. 6 illustrates a illustrates a method of recording an information signal (IS) according to axiom 1 and further encrypting and adding screening info (SI) and hash information as a watermark in the recorded information signal. First the watermark (WM) 603 is detected in the information signal (IS) 601. Then a hash watermark (HA_WM) is embedded 604 with screening information, which is preferably dependent upon the information signal IS 601. This hash watermark is added to the information signal. The hash watermark may also be added further down, as long as it happens before encryption, if applicable.

In 605 it is checked whether watermark information is CO and if it is the watermark copy no more (CNM) is added 609 and the information signal is encrypted 611. The encrypted information signal comprising both the CNM watermark and the hash watermark is recorded on a storage medium 613. If the watermark information is not CO, it is checked whether the watermark is CF 607 and if it is the information signal comprising the hash watermark is stored unencrypted as clear text on the storage medium 613.

The hash watermark can, and should be fragile since it has no use after playback. It should carry a content dependent payload, so that this fragile mark cannot be "distilled" and added to all content that a pirate wants to copy.

The invention claimed is:

1. A method of recording an information signal with first copy protection information to a storage medium using recording means, said recording being performed according to first copy rules identified by said first copy protection information, said method comprising the acts of:

detecting said first copy protection information identifying said first copy rules, recording at least second copy protection information according to said detected first copy rules, said first and at least second copy protection information identifying a legality message to be interpreted by reading means, recording screening information in a safe way on said storage medium, said screening information identifying that the first copy protection information has been read, wherein said screening information comprises a hash of at least a part of said information signal.

2. The method according to claim 1, wherein said second copy protection information is recorded in combination with third copy protection information according to said detected first copy rules, said combination of second and third copy protection information together with said first copy protection information identifying said legality message to be interpreted by said reading means.

3. The method according to claim 2, wherein the first copy protection information is a first watermark and wherein the second copy information is either an encrypted information signal or an unencrypted information signal, the encryption of said information signal being performed using a first encryption process having a first predefined level of security and wherein the third copy information is a second watermark.

4. The method according claim 3, wherein the screening information is encrypted using a second encryption process before being stored on the storage medium.

5. The method according to claim 4, wherein the second encryption process has a level of security at least equaling the first predefined level of security.

6. The method according to claim 1, wherein the screening information is being stored on said storage medium in a safe channel where only the recording means can record data.

7. The method according to claim 1, wherein said screening information is stored in a watermark being added to the information signal before recording the information signal to the recording medium.

8. The method according to claim 7, wherein the watermark storing the screening information is fragile.

9. A device for recording an information signal with first copy protection information to a storage medium using recording means, said recording being performed according to first copy rules identified by said first copy protection information, said arrangement comprising:

means for detecting said first copy protection information identifying said first copy rules, means for recording at least second copy protection information according to said detected first copy rules, said first and at least second copy protection information identifying a legality message to be interpreted by reading means, means for recording screening information in a safe way on said storage medium, said screening information identifying that the first copy protection information has been read, wherein said screening information comprises a hash of at least a part of said information signal.

* * * * *